(12) United States Patent
Huang et al.

(10) Patent No.: US 8,035,740 B2
(45) Date of Patent: Oct. 11, 2011

(54) IMAGE PROCESSING APPARATUS AND METHOD

(75) Inventors: Jing Jung Huang, Taipei (TW); Yi Chou Chen, Chiayi County (TW)

(73) Assignee: Realtek Semiconductor Corp., Hsinchu (TW)

( * ) Notice: Subject to any disclaimer, the term of this patent is extended or adjusted under 35 U.S.C. 154(b) by 1182 days.

(21) Appl. No.: 11/749,495

(22) Filed: May 16, 2007

(65) Prior Publication Data

US 2007/0268401 A1 Nov. 22, 2007

(30) Foreign Application Priority Data

May 19, 2006 (TW) ................. 95117800 A

(51) Int. Cl.
*H04N 7/01* (2006.01)
*H04N 9/74* (2006.01)

(52) U.S. Cl. ........................ 348/448; 348/581

(58) Field of Classification Search ............... 348/448, 348/451, 452, 441, 458, 459, 581, 582; *H04N 7/01, H04N 11/20, 9/74*

See application file for complete search history.

(56) References Cited

U.S. PATENT DOCUMENTS 6,118,486 A * 9/2000 Reitmeier ................ 348/441
6,597,402 B1 * 7/2003 Butler et al. ............. 348/447

FOREIGN PATENT DOCUMENTS

TW I220844 9/2004
TW I251434 3/2006

* cited by examiner

*Primary Examiner* — Sherrie Hsia
(74) *Attorney, Agent, or Firm* — Lowe Hauptman Ham & Berner, LLP

(57) ABSTRACT

An image processing apparatus for deinterlacing and vertical scaling a plurality of initial scan lines includes a control unit, a deinterlacer, a vertical scaler and a buffer. The control unit controls the deinterlacer and the vertical scaler to store parts of the processed scan lines thereof into the buffer according to a scaling ratio factor and a vertical scaling algorithm.

16 Claims, 5 Drawing Sheets

IMAGE PROCESSING APPARATUS AND METHOD

CROSS REFERENCE TO RELATED APPLICATION

This application claims the priority benefit of Taiwan Patent Application Serial Number 095117800, filed on May 19, 2006, the full disclosure of which is incorporated herein by reference.

BACKGROUND OF THE INVENTION

1. Field of the Invention

This invention generally relates to an image processing apparatus and method, and more particularly, to an image processing apparatus and method in a video output system.

2. Description of the Related Art

A conventional image processing apparatus usually performs deinterlacing and vertical scaling on images. However, in order to perform deinterlacing and vertical scaling, the scan lines of the images have to be accessed frequently so as to execute interpolation operation. Therefore, the accessing method of the scan lines will influence the performances of the deinterlacing and vertical scaling.

Since conventional methods of accessing scan lines are unsatisfactory, a same scan line may be accessed and executed repeatedly during deinterlacing and vertical scaling thereby causing redundant using of the bandwidth.

SUMMARY OF THE INVENTION

It is an object of the present invention to provide an image processing apparatus to solve aforementioned problems.

It is another object of the present invention to provide an image processing apparatus which utilizes a control unit to control the access of the scan lines and prioritize to store the scan lines occupying more bandwidth into a storage unit.

In order to achieve above objects, the present invention provides an image processing apparatus for deinterlacing and vertical scaling a plurality of initial scan lines. The image processing apparatus mainly includes a control unit, an accessor, a deinterlacer, a line buffer and a vertical scaler, wherein the control unit is utilized for receiving at least one scaling ratio factor and a field number parameter; the accessor is coupled to the control unit for accessing at least one of the initial scan lines according to the control of the control unit; the deinterlacer is coupled to the control unit and the accessor for outputting at least one corresponding scan line according to the accessed initial scan lines; the line buffer is coupled to the deinterlacer for storing at least one of the corresponding scan lines outputted from the deinterlacer; the vertical scaler is coupled to the control unit, the deinterlacer and the line buffer for performing a vertical scaling according to the at least one corresponding scan line outputted from the deinterlacer, the corresponding scan line stored in the line buffer and a vertical scaling algorithm thereby outputting at least one output scan line; wherein the control unit determines whether to store the at least one corresponding scan line into the line buffer according to the scaling ratio factor and the vertical scaling parameter.

The present invention further provides an image processing method for deinterlacing and vertical scaling a plurality of initial scan lines. The image processing method includes the following steps: accessing at least one of the plurality of initial scan lines according to a field number parameter; utilizing a deinterlacer to output at least one corresponding scan line according to the accessed initial scan lines; determining whether to store the at least one corresponding scan line into a storage unit according to a scaling ratio factor and a vertical scaling algorithm; and performing a vertical scaling according to the at least one corresponding scan line, at least one of the previously stored scan lines and the vertical scaling algorithm thereby outputting at least one output scan line.

BRIEF DESCRIPTION OF THE DRAWINGS

Other objects, advantages, and novel features of the present invention will become more apparent from the following detailed description when taken in conjunction with the accompanying drawings.

FIG. 2b shows a schematic diagram of a scaling process performed by the image processing apparatus and method according to the embodiment of the present invention, which follows the process shown in FIG. 2a.

FIG. 3b shows a schematic diagram of a scaling process performed by the image processing apparatus and method according to another embodiment of the present invention, which follows the process shown in FIG. 3a.

DETAILED DESCRIPTION OF THE EMBODIMENTS

Referring now in detail to exemplary embodiments of the present invention, which are illustrated in the accompanying drawings, in which like numerals designate like elements.

Figure 1:
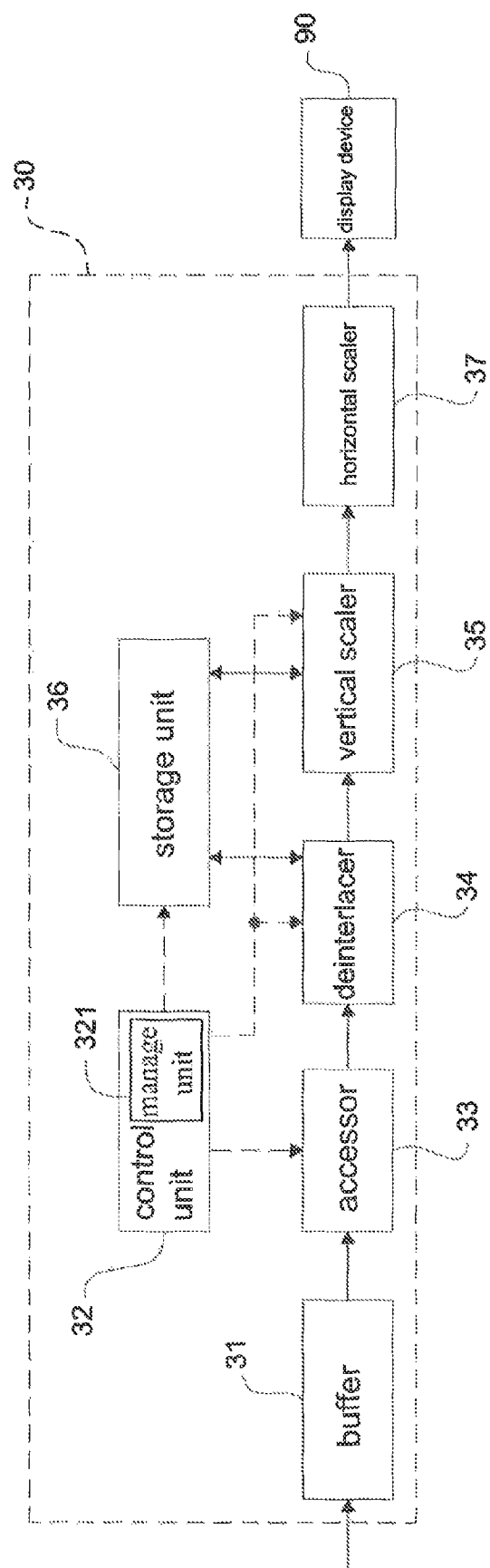
FIG. 1 shows a block diagram of an image processing apparatus and method according to an embodiment of the present invention.

Referring to FIG. 1, an image processing apparatus 30 according to an embodiment of the present invention includes a buffer 31, a control unit 32, an accessor 33, a deinterlacer 34, a vertical scaler 35 and a storage unit 36, and the image processing apparatus 30 outputs image signals to a display device 90 so as to display images on the display device 90. The present invention may further include a horizontal scaler 37 coupled between the vertical scaler 35 and the display device 90 so as to horizontally scale the image signals outputted from the vertical scaler 35 and to output the horizontally scaled image signals to the display device 90. Since the implementation of the horizontal scaler 37 is appreciated to those skilled in the art, the detailed description will not be illustrated hereinafter.

Referring further to FIG. 1 again, in the image processing apparatus 30, one embodiment of the buffer 31 is a frame buffer; the control unit 32 controls the operations of the accessor 33, the deinterlacer 34, the vertical scaler 35 and the storage unit 36 in accordance with an image scaling ratio factor and a field number parameter. The controlling of the above-mentioned elements, e.g. accessor 33, under the control unit 32 can be implemented by hardware or firmware (software). One embodiment of the accessor 33 is a direct memory access (DMA), and the accessor 33 accesses one or more scan lines from the buffer 31 according to the control signals outputted from the control unit 32. The deinterlacer 34 outputs a corresponding scan line which is deinterlaced or not deinterlaced according to the scan lines accessed by the accessor 33. The deinterlacer 34 stores specific corresponding scan lines into the storage unit 36 according to the control of the control unit 32. In this embodiment, the specific corresponding scan lines are the scan lines which will be executed in the later processing, e.g. deinterlacing and vertical scaling. In addition, the vertical scaler 35 vertically scales the scan lines outputted from the deinterlacer 34 and/or the scan lines stored in the storage unit 36 according to the control signals outputted from the control unit 32. The control unit 32 in accordance with the present invention may further include a manage unit 321 for managing and updating the data stored in the storage unit 36 according to the scale ratio factor and a predetermined vertical scaling algorithm. In this embodiment, the storage unit 36 is a line buffer, which can store at least one scan line. In an alternative embodiment of the present invention, the accessor 33 may access the needed scan lines via an external storing device, and hence the buffer 31 may be omitted.

When the image processing apparatus 30 is in operation, the buffer 31 receives and temporarily stores a field from an image source, which may be an odd field or an even field; the control unit 32 sends a signal to the accessor 33 according to field number parameters so as to control the accessor 33 to access at least one scan line from the buffer 31 to be executed by the deinterlacer 34. After the deinterlacer 34 executes the scan lines outputted from the accessor 33, the deinterlacer 34 generates corresponding scan lines and sends them to the vertical scaler 35 for vertical scaling. In addition, the control unit 32 can predict the scan lines which will be utilized by the vertical scaler 35 according to the scale ratio factor and the predetermined vertical scaling algorithm so as to control the deinterlacer 34 to temporarily store the scan lines, which will be executed in the later processing, into the storage unit 36. Additionally, the control unit 32 sends a signal to the vertical scaler 35, according to the scaling ratio factor and the predetermined scaling algorithm, to control the vertical scaler 35 vertically scales the scan lines outputted from the deinterlacer 34 and the scan lines stored in the storage unit 36. Furthermore, the control unit 32 can send a signal to the deinterlacer 34 in accordance with a predetermined deinterlacing algorithm so as to control the deinterlacer 34 to deinterlace the scan lines outputted from the accessor 33 and the scan lines stored in the storage unit 36.

Figure 2A:
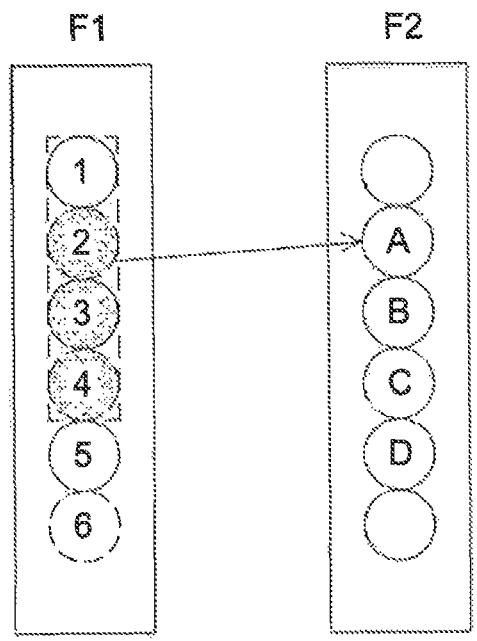
FIG. 2a shows a schematic diagram of a scaling process performed by the image processing apparatus and method according to the embodiment of the present invention.

Referring now to FIGS. 1 and 2a to 2d, they illustrate an image processing apparatus and method according to an embodiment of the present invention. In this embodiment, the storage unit 36 can temporarily store three scan lines, and the vertical scaler 35 is a 4-tap filter, however, this is just one embodiment and should not be adapted to limit the scope of the present invention. As shown in FIGS. 2a to 2d, assuming the rectangle frame F1 contains six scan lines which are respectively numbered as #1 to #6, wherein the scan lines #1, #3 and #5 designate the non-deinterlaced scan lines generated by the deinterlacer 34, and the scan lines #2, #4 and #6 designate the deinterlaced scan lines generated by the deinterlacer 34. The filled scan lines in the rectangular frame F1 designate the scan lines which will be re-stored into the storage unit 36 by the vertical scaler 35, e.g. scan lines #2, #3 and #4 as shown in FIG. 2a. Rectangular frame F2 contains a plurality of scan lines numbered as #A to #D hereinafter, generated by vertical scaling, wherein the scan lines #A to #D represent the vertical scaled scan lines generated by the vertical scaler 35, and the dotted rectangular in the rectangular frame F1 contains the needed scan lines in order to generate the scan lines #A, #B, #C and #D.

Figure 2B:
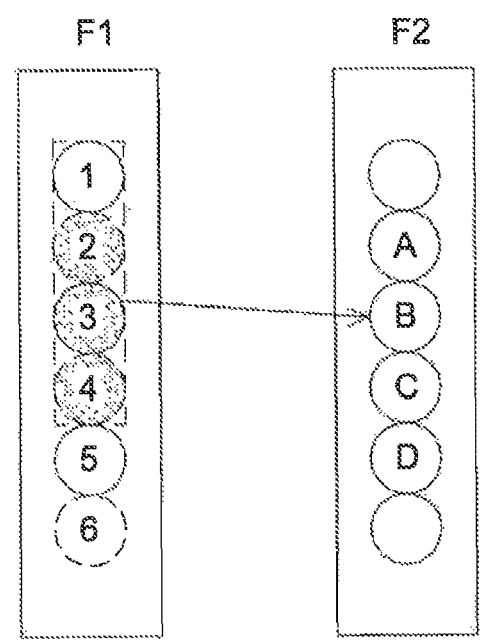

Referring to FIG. 2a, when it is desired to generate the scan line #A in the rectangular frame F2, the vertical scaler 35 utilizes the scan lines #1 to #4 in the rectangular frame F1 to generate the scan line #A according to a predetermined vertical scaling algorithm, and then the control unit 32 controls the vertical scaler 35 to re-store the scan lines #2 to #4 in the rectangular frame F1 back into the storage unit 36. Referring now to FIG. 2b, when it is desired to generate the scan line #B in the rectangular frame F2, the vertical scaler 35 will read out the scan lines #2 to #4 from the storage unit 36 according the vertical scaling algorithm and the scan line #1 from the buffer 31 so as to generate the scan line #B from the scan lines #1 to #4, and then again re-store the scan lines #2 to #4 back into the storage unit 36. It should be noted that the vertical scaler 35 does not re-store the scan lines #1 to #3 back into the storage unit 36 because the scan line #1 needs not to be generated by the deinterlacer 34 through deinterlacing. Therefore, reading the scan line #1 from the buffer 31 occupies relatively fewer bandwidth than re-generating the scan line #4 from the deinterlacer 34.

Figure 2C:
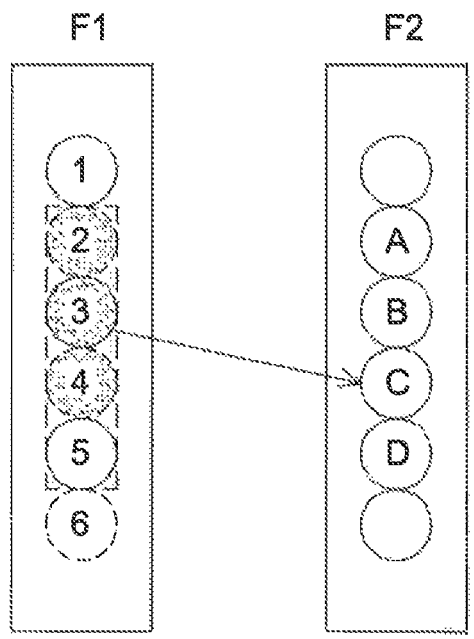
FIG. 2c shows a schematic diagram of a scaling process performed by the image processing apparatus and method according to the embodiment of the present invention, which follows the process shown in FIG. 2b.

Referring now to FIG. 2c, when it is desired to generate the scan line #C in the rectangular frame F2, the vertical scaler 35 reads out the scan lines #2 to #4 from the storage unit 36 and reads the scan line #5 from the buffer 31, and then utilizes the scan lines #2 to #5 in the rectangular frame F1 to generate the scan line # C according to a predetermined algorithm. Because the control unit 32 is set to know that to generate the scan lines #2, #4 and #6 by the deinterlacer 34 occupies more bandwidth than to read the scan lines #1, #3 and #5 from the buffer 31, the control unit 32 controls the vertical scaler 35 to re-store the scan lines #2 to #4 back into the storage unit 36 rather than to store the scan lines #3 to #5 back into the storage unit 36. It should be noted that, in the above-mentioned description, if the scan lines #2 to #4 have already existed in the storage unit 36 after the scan lines #A, #B, and #C are generated, i.e. the scan lines #2 to #4 are not overwritten by other scan line data, the control unit 32 needs not to control the vertical scaler 35 to restore the scan lines #2 to #4 back into the storage unit 36.

Figure 2D:
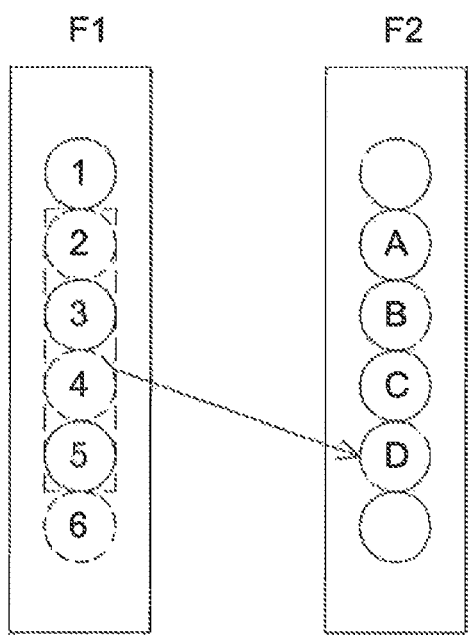
FIG. 2d shows a schematic diagram of a scaling process performed by the image processing apparatus and method according to the embodiment of the present invention, which follows the process shown in FIG. 2c.

Referring to FIG. 2d, when it is desired to generate the scan line #D in the rectangular frame F2, the vertical scaler 35 reads the scan lines #2 to #4 from the storage unit 36 and re-reads the scan line #5 from the buffer 31 so as to utilize the scan lines #2 to #5 to generate the scan line #D according to the vertical scaling algorithm. Because the scan line #5 needs not be generated through deinterlacing, re-reading the scan line #5 from the buffer 31 will not take high bandwidth, and the scan lines #3 to #5 will be re-stored back into the storage unit 36 for later processing after the scan line #D has been generated.

Figure 3A:
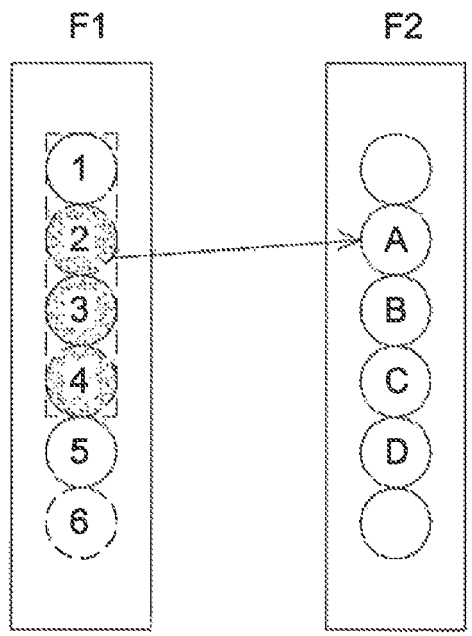
FIG. 3a shows a schematic diagram of a scaling process performed by the image processing apparatus and method according to another embodiment of the present invention.
Figure 3B:
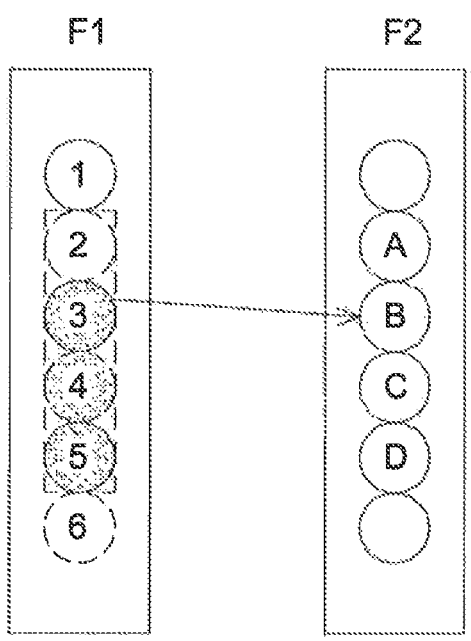
Figure 3C:
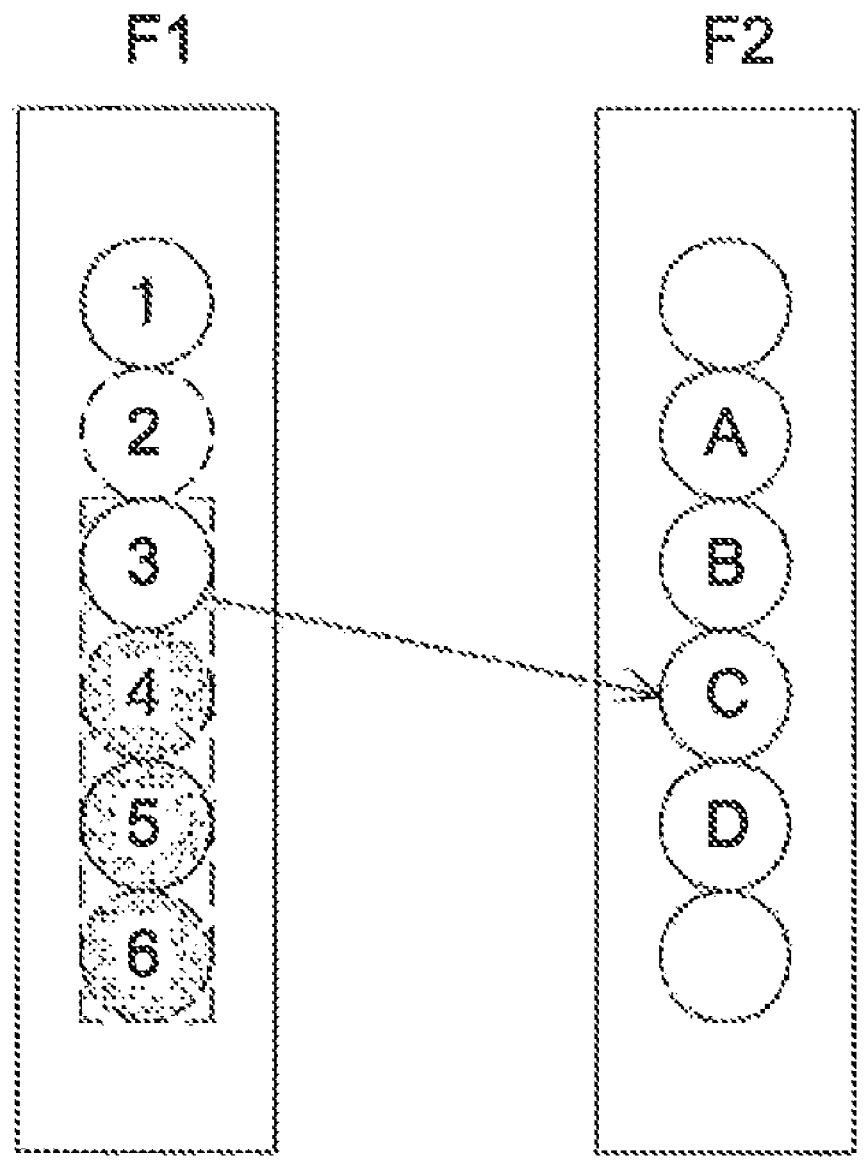
FIG. 3c shows a schematic diagram of a scaling process performed by the image processing apparatus and method according to another embodiment of the present invention, which follows the process shown in FIG. 3b.

Referring now to FIG. 3a to 3c, in an alternative embodiment of the present invention, the vertical scaler 35 can be controlled to re-store the scan lines #2 to #4 into the storage unit 36 after the scan line #A has been generated by the vertical scaler 35 through utilizing the scan lines #1 to #4; the vertical scaler 35 then generates the scan line #B by utilizing the scan lines #2 to #5 after it reads the scan lines #2 to #4 stored in the storage unit 36 and receives the scan line #5 from the deinterlacer 34, and then re-stores the scan lines #3 to #5 back into the storage unit 36; then the vertical scaler 35 generates the scan line #C by utilizing the scan lines #3 to #6 after it reads out the scan lines #3 to #5 stored in the storage unit 36 and receives the scan line #6 from the deinterlacer 34, and then re-stores the scan lines #4 to #6 back into the storage unit 36. Unlike the first embodiment, the scan lines #2, #4 and #6 in this embodiment needed to be generated by deinterlacing are not required to be prioritizedly stored back into the storage unit 36.

Although the invention has been explained in relation to its preferred embodiments, it is not used to limit the invention. It is to be understood that many other possible modifications and variations can be made by those skilled in the art without departing from the spirit and scope of the invention as hereinafter claimed.

What is claimed is:

1. An image processing apparatus for deinterlacing and vertical scaling a plurality of initial scan lines, the image processing apparatus comprising:
   a control unit for receiving at least one parameter;
   an accessor coupled to the control unit for accessing at least one of the initial scan lines according to the control of the control unit;
   a deinterlacer coupled to the control unit and the accessor for outputting at least one corresponding scan line according to the accessed initial scan lines;
   a storage unit coupled to the deinterlacer for storing at least one of the corresponding scan lines outputted from the deinterlacer; and
   a vertical scaler coupled to the control unit, the deinterlacer and the storage unit for performing a vertical scaling according to the at least one corresponding scan line outputted from the deinterlacer and at least one of the corresponding scan lines stored in the storage unit thereby outputting at least one output scan line;
   wherein the control unit determines whether to store the corresponding scan line into the storage unit according to the parameter.

2. The image processing apparatus as claimed in claim 1, wherein the parameter comprises a scaling ratio factor and/or a field number parameter.

3. The image processing apparatus as claimed in claim 1, wherein the storage unit is a line buffer.

4. The image processing apparatus as claimed in claim 1, wherein the at least one corresponding scan line is generated by the deinterlacer through performing or without performing deinterlacing, and the control unit controls the deinterlacer to primarily store the deinterlaced corresponding scan line into the storage unit.

5. The image processing apparatus as claimed in claim 1, further comprising:
   a horizontal scaler coupled to the vertical scaler for horizontally scaling the output scan line.

6. The image processing apparatus as claimed in claim 1, wherein the vertical scaler performs the vertical scaling according to a vertical scaling algorithm.

7. The image processing apparatus as claimed in claim 6, wherein the control unit determines whether to store the at least one corresponding scan line into to the storage unit according to the vertical scaling algorithm.

8. The image processing apparatus as claimed in claim 1, wherein the control unit is coupled to the storage unit and manages the scan lines storing thereof.

9. The image processing apparatus as claimed in claim 1, wherein the vertical scaler stores at least one of the scan lines performed vertical scaling into the storage unit according to the control of the control unit.

10. The image processing apparatus as claimed in claim 1, further comprising a memory for saving the plurality of initial scan lines.

11. An image processing method for deinterlacing and vertical scaling a plurality of initial scan lines, the image processing method comprising the steps of:
    accessing at least one of the plurality of initial scan lines;
    utilizing a deinterlacer to output at least one corresponding scan line according to the accessed initial scan lines;
    determining whether to store the at least one corresponding scan line into a storage unit according to a parameter and a vertical scaling algorithm; and
    performing a vertical scaling according to the at least one corresponding scan line, at least one of the previously stored scan lines and the vertical scaling algorithm thereby outputting at least one output scan line;
    wherein the parameter comprises at least one scaling ratio factor.

12. The image processing method as claimed in claim 11, wherein the parameter further comprises a field number parameter.

13. The image processing method as claimed in claim 11, wherein the storage unit is a line buffer.

14. The image processing method as claimed in claim 11, wherein the at least one corresponding scan line is generated by the deinterlacer through performing or not performing deinterlacing, and a control unit controls the deinterlacer to primarily store the deinterlaced corresponding scan line into the storage unit.

15. The image processing method as claimed in claim 11, further comprising the following step:
    performing horizontal scaling on the output scan line.

16. The image processing method as claimed in claim 11, further comprising the following step:
    storing at least one of the scan lines performed vertical scaling into the storage unit.

* * * * *